(12) United States Patent
Côté

(10) Patent No.: US 7,739,982 B2
(45) Date of Patent: Jun. 22, 2010

(54) BIRD FEEDER

(76) Inventor: Paul Côté, 18 Valleyview Road, Knowlton, Quebec (CA) J0E 1V0

( * ) Notice: Subject to any disclaimer, the term of this patent is extended or adjusted under 35 U.S.C. 154(b) by 191 days.

(21) Appl. No.: 11/807,628

(22) Filed: May 30, 2007

(65) Prior Publication Data

US 2008/0295777 A1 Dec. 4, 2008

(51) Int. Cl.
*A01K 39/01* (2006.01)
(52) U.S. Cl. .................... 119/57.9; 119/52.2; 119/52.3; 119/57.8
(58) Field of Classification Search .............. 119/51.01, 119/52.3, 57.9, 59, 63
See application file for complete search history.

(56) References Cited

U.S. PATENT DOCUMENTS 4,223,637 A * 9/1980 Keefe .................... 119/52.2

| | | | | |
|---|---|---|---|---|
| 5,195,459 A * | 3/1993 | Ancketill | .................... | 119/57.9 |
| 6,622,654 B2 * | 9/2003 | Fasino | .................... | 119/57.9 |
| 6,945,192 B2 * | 9/2005 | Cote | .................... | 119/57.9 |
| 7,191,731 B2 * | 3/2007 | Cote | .................... | 119/57.9 |
| 7,219,621 B2 * | 5/2007 | Coroneos | .................... | 119/57.1 |

\* cited by examiner

*Primary Examiner*—Kimberly S Smith
*Assistant Examiner*—Danielle Clerkley
(74) *Attorney, Agent, or Firm*—Eric Fincham

(57) ABSTRACT

A squirrel resistant bird feeder having a seed container, a seed tray mounted below the seed container, a shroud extending about the seed member and seed tray, the shroud having openings in a lower portion thereof, with a spring member mounted internally of the seed container and being enclosed by a central tube, the spring member having a first end thereof abutting a portion of the seed tray and a second end acting on the cover and shroud. Any excessive weight placed on the shroud or cover will cause the shroud to move downwardly covering the seed tray.

14 Claims, 14 Drawing Sheets

BIRD FEEDER

FIELD OF THE INVENTION

The present invention relates to a bird feeder and more particularly, relates to a bird feeder which prevents large birds and other animals from obtaining feed therefrom.

BACKGROUND OF THE INVENTION

Selective bird feeders are well known in the art and are designed to limit the maximum size of a bird or animal which can access the seed in the feeder. The reasons for excluding certain birds may be many. Thus, as disclosed in U.S. Pat. No. 3,241,525, there is provided a selective bird feeder which is specific to cardinals. As taught by this patent, a favorite seed of cardinals is a sunflower seed; this seed is also popular with both smaller and larger birds.

Some larger birds will also access the seed within a bird feeder and many such birds, such as crows, grackles, blue jays and the like are considered by some people to be undesirable.

A further problem associated with bird feeders is marauders which gain access to the seeds. In particular, squirrels are well known for their ability to reach the seed in a bird feeder and to devour the same. Many approaches have been tried to discourage or prevent squirrels from reaching the bird feeder, including various types of covers and baffles on poles. These seldom work as squirrels have shown great ingenuity in overcoming such devices.

There are also many proposals in the art for squirrel proof bird feeders which utilize a shroud to cover openings in the side wall of a seed container. The shroud is biased to a first position, usually by a spring member, such that when weight is placed on the shroud, it moves to cover the feed openings. Thus, reference may be had to U.S. Pat. Nos. 5,445,109 and 6,945,192 which disclose such arrangements.

While such shroud type squirrel proof bird feeders are useful, they are relatively costly to manufacture and assemble due to different requirements such as maintaining the openings in the shroud and openings in the side wall of the seed container in alignment. One must also take into account inclement weather which can affect the functioning of the bird feeder.

SUMMARY OF THE INVENTION

It is an object of the present invention to provide a squirrel proof bird feeder which is relatively inexpensive due to a minimum number of components.

It is a further object of the present invention to provide a squirrel proof bird feeder wherein the seed is transferred from a seed container to a seed tray from which the birds may have access thereto.

According to one aspect of the present invention, there is provided a squirrel resistant bird feeder comprising a seed container, a seed tray mounted below the seed container, a shroud extending about the seed container and the seed tray, at least one opening in a lower portion of the shroud, a spring member mounted internally of the seed container, a first end of the spring member biasing the seed tray, a second end of the spring abutting a portion of the shroud such that the shroud is biased to a first position wherein the at least one opening in the shroud permits access to the seed tray, the shroud being moveable to a second position when a weight on the shroud compresses the spring, the second position denying access to the seed tray, a central tube enclosing the spring and a cover member placed over the shroud.

According to a further aspect of the present invention there is provided a squirrel resistant bird feeder comprising a seed container, a seed tray mounted below the seed container, a shroud extending about at least a portion of the seed container and the seed tray, at least one opening in a lower portion of the shroud, a cover member extending over the shroud and being secured thereto, a central tube extending between the seed tray to an upper portion of the seed container, a center post within the central tube, the center post being secured to the seed tray, the center post extending through the cover member; and a spring member mounted about the center post within the central tube, a first end of the spring member abutting a portion of the seed tray, a second end of the spring being arranged such that the shroud is biased to a first position when the at least one opening in the shroud permits access to the seed tray, the shroud being moveable to a second position when a weight on the shroud compresses the spring, the second position denying access to the seed tray.

The squirrel resistant bird feeder of the present invention utilizes a seed tray which is mounted below a seed container to receive seed therefrom. It is the seed tray which is accessed by the birds. This arrangement eliminates the use of baffles in the side wall of the seed container and also eliminates the use of various guide members in order to maintain alignment between openings in the shroud and the seed container.

The spring member is mounted internally of the seed container and has a central tube enclosing the same to prevent seed from disturbing the functioning of the spring member.

The present invention also utilizes a center post which is attached to the seed tray and which center post extends exteriorly of the cover. A hanger is mounted on the exterior portion of the post. In this embodiment, the hanger prevents removal of the cover and shroud. In order to gain access to the seed container, the hanger is removed and the cover and shroud lifted.

In a preferred embodiment, the cover and the shroud are secured together and conveniently may be formed as a single piece.

The center post, as aforementioned, is preferably attached to the seed tray and has a distal end thereof extending exteriorly of the cover. The hanger may be attached through a hole extending through the center post, the hole being located proximate to the cover such that it maintains the cover (and shroud) in position on the feeder. The post, instead of being attached to the seed tray, could be attached to the central tube to provide an equivalent structure. Other equivalent combinations could be utilized in that the spring may be biased against the bottom of the center tube which in turn will bias the seed tray. The tube may form a portion of the seed container.

Conveniently, a plunger may be utilized to receive one end of the spring member and which plunger has a second end abutting the cover. Thus, it will be the plunger which will move in a vertical direction as any pressure is placed on either the negative grip tube member, the cover or the shroud.

At the upper end of the central tube, there is provided a sealing member to substantially prevent moisture and debris from gaining access to the plunger and central tube. The sealing member is preferably in the form of a boot having an accordion like structure.

In a preferred embodiment, the bird feeder may include a plurality of perches located on the shroud. In such a preferred embodiment, the perches are pivotable between a storage position and a normal use position. The movement between the storage position and normal use position permits the shipping of the bird feeders in a minimal space.

A negative grip tube comprises a tube which is slidable on the hanger and in its normal position, will cover the connection between the hanger and the center post. This member also functions to prevent a squirrel from grabbing onto the hanger and thereby gaining access to the feeder.

As used herein, the center post may be either a rigid metallic member or alternative structures such as a cable may be employed.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
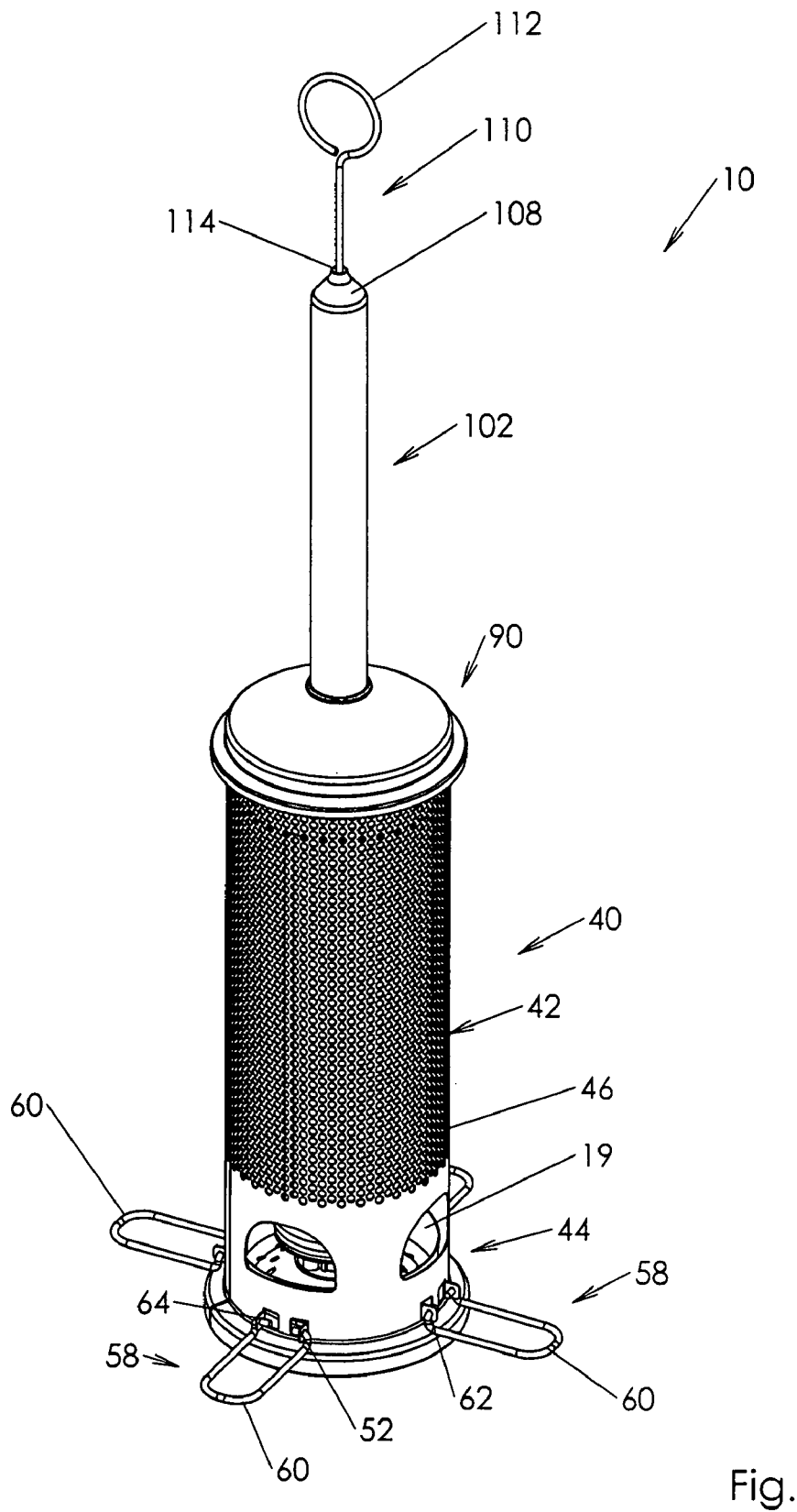
FIG. 1 is a perspective view of a bird feeder according to one embodiment of the present invention.
Figure 2:
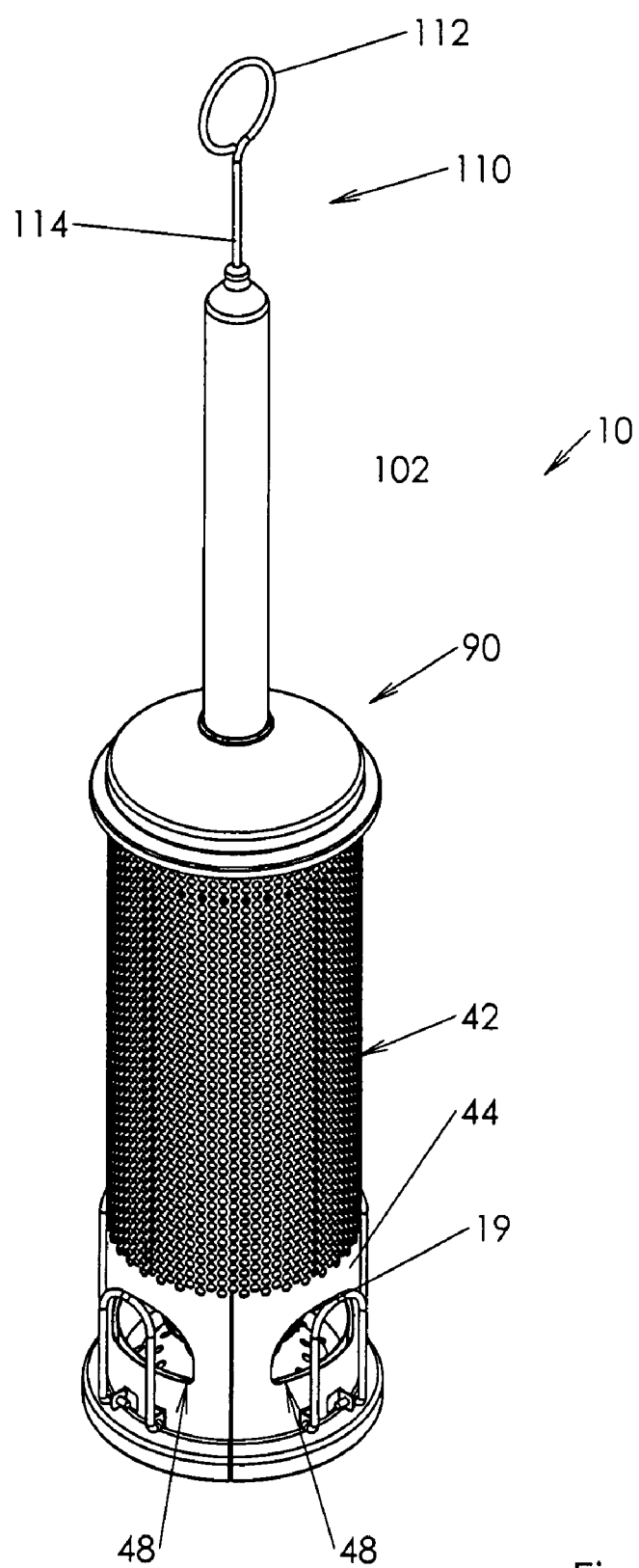
FIG. 2 is a view similar to FIG. 1 illustrating the perches in a position for shipping.
Figure 3:
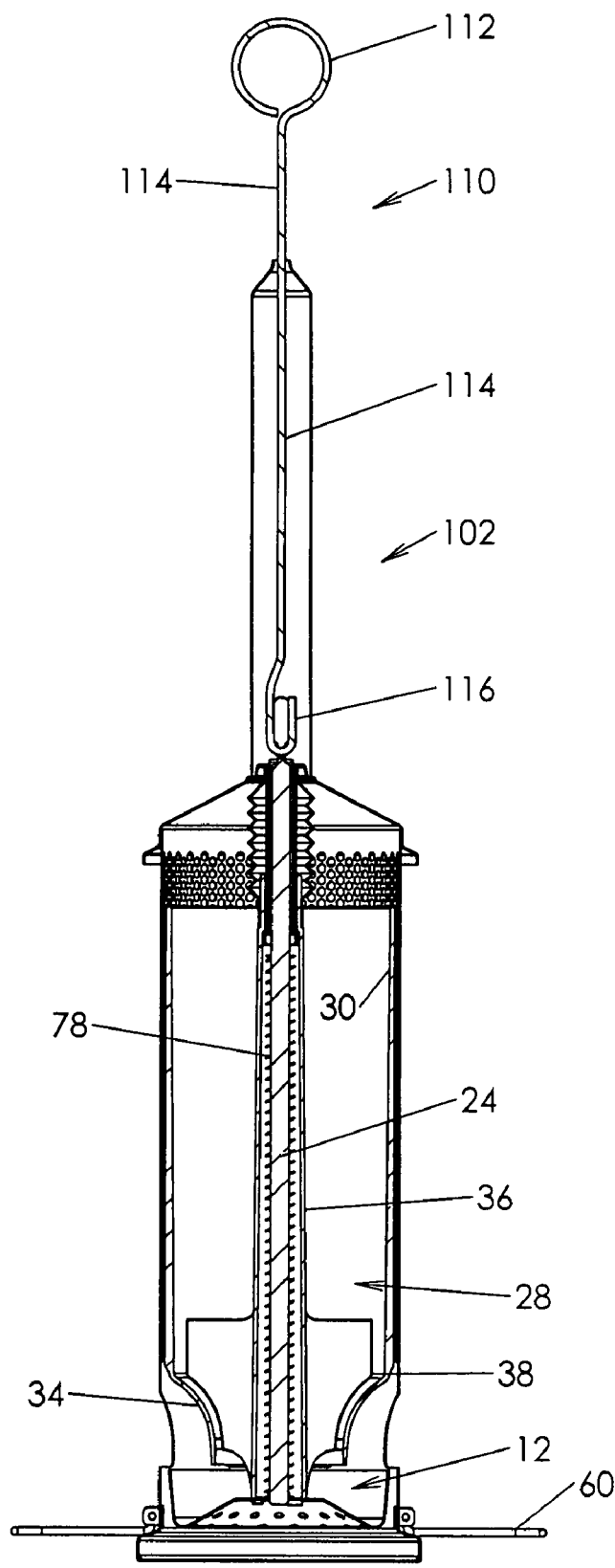
FIG. 3 is a sectional view thereof in an open position.
Figure 4:
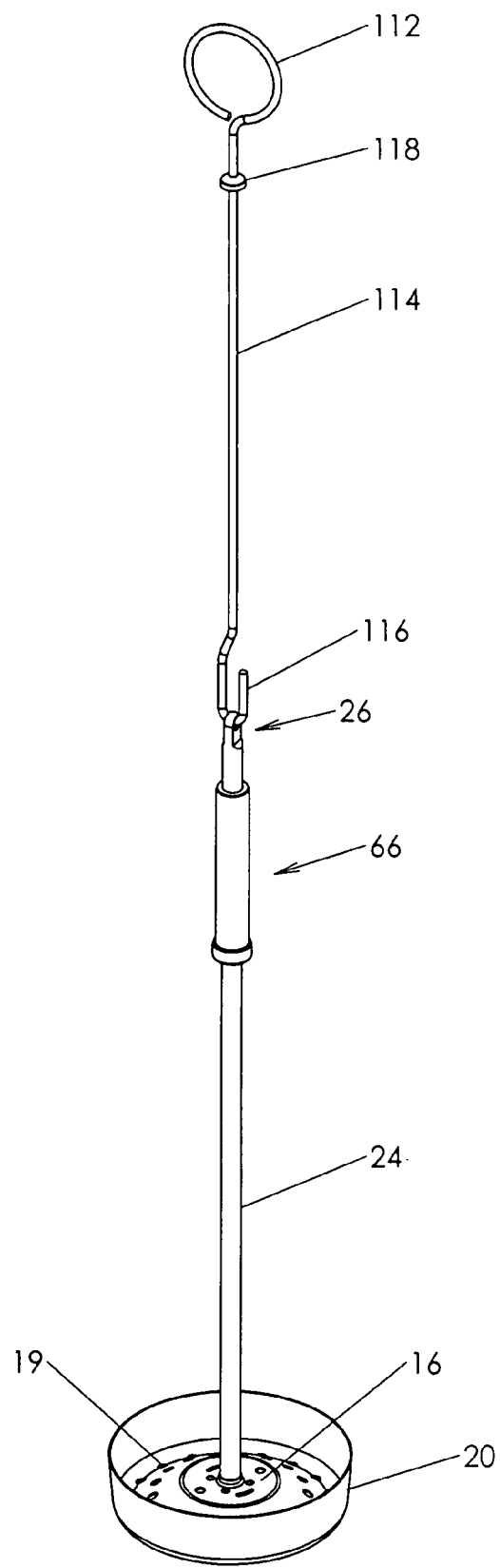
FIG. 4 is a perspective view of the seed tray post secured thereto, and the hanger.
Figure 5:
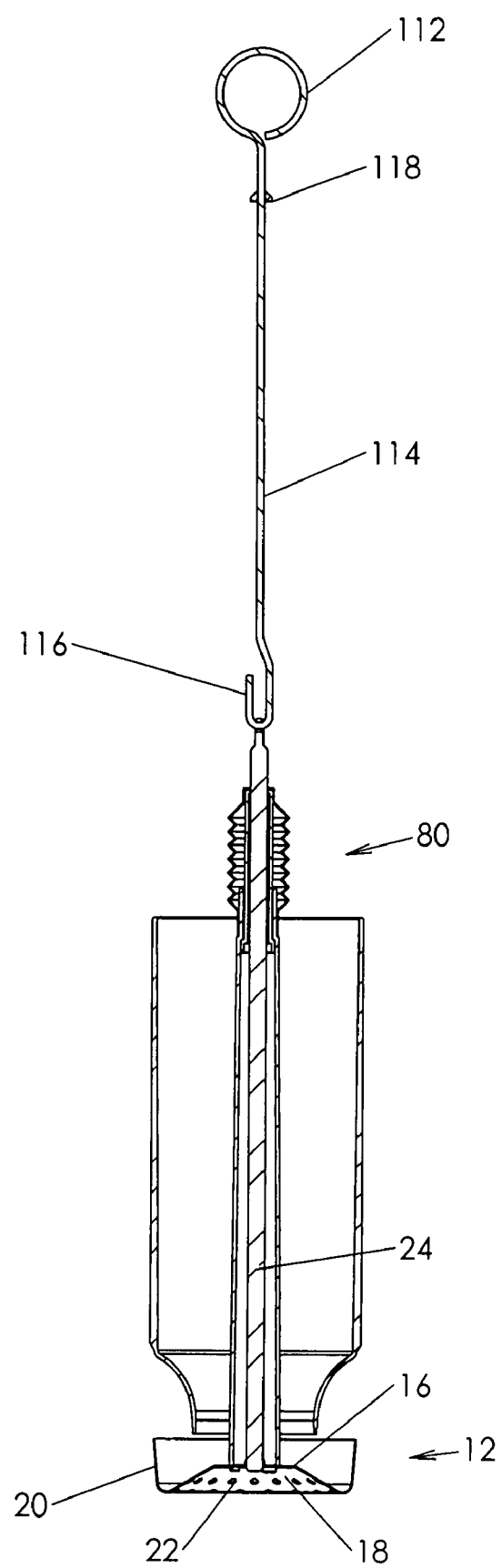
FIG. 5 is a sectional view showing the seed tray and seed container.
Figure 6:
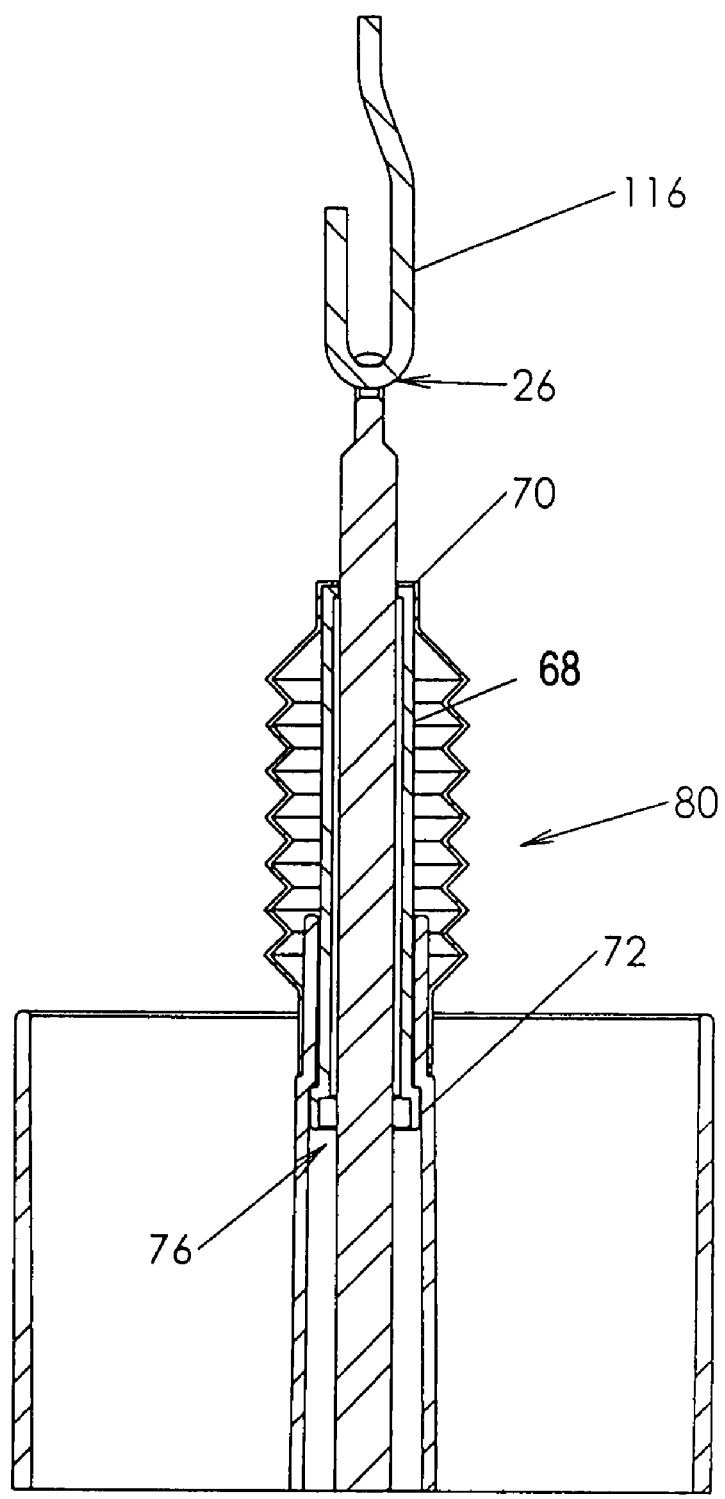
FIG. 6 is an enlarged view of the top portion thereof.

Referring to the drawings in greater detail and by reference characters thereto, there is illustrated in FIG. 1 a perspective view of a bird feeder according to one embodiment of the present invention and which bird feeder is generally designated by reference numeral 10.

Bird feeder 10 includes a seed tray which is generally designated by reference numeral 12. Seed tray 12 comprises a base defined by a center horizontal wall 16 which merges with a downwardly sloping wall 18. Downwardly sloping wall 18 then merges with a bottom wall 19 and an upwardly extending side wall 20. A plurality of drainage apertures 22 are provided both in bottom wall 19 and sloping wall 18 to permit the drainage of any moisture from seed tray 12.

Extending upwardly from center wall 16 is a center post 24 which includes an aperture 26 at its upper distal end.

Bird feeder 10 further includes a seed container generally designated by reference numeral 28. Seed container 28 includes a cylindrical side wall 30. At the lower end of seed container 28, there is provided a bottom side wall 34 which extends inwardly for reasons which will become apparent hereinbelow. There is further provided a center tube 36 which surrounds center post 24. Center tube 36 is connected to bottom side wall 34 by means of a plurality of connecting ribs or flanges 38.

Extending about seed tube 28 is a shroud generally designated by reference numeral 40. Shroud 40 includes an upper portion 42 and a lower portion 44. Upper portion 42 includes a plurality of apertures 46 formed therein while lower portion 46 includes feed openings 48 which permit access to seed tray 12 as will be discussed hereinbelow. In the illustrated embodiment, there are provided four such feed openings.

Mounted on lower portion 44 are ears 50, each ear 50 having a base 52 secured to lower portion 44 with a leg 54 extending outwardly therefrom. Each leg 54 includes an aperture 56. As may be seen in the drawings, ears 50 are formed by a punch out in the side wall of lower portion 44 of shroud 40.

In the illustrated embodiment, there are illustrated four perches 58, each having a U-shaped section 60 designed to support a bird. There is also provided an upwardly extending legs 62 and inwardly extending legs 64, the inwardly extending legs 64 seating in apertures 56 as shown in the drawings.

At the upper end of center post 24, there is provided a plunger generally designated by reference numeral 66. Plunger 66 includes a cylindrical body 68 with a top inwardly extending portion 70 abutting against center post 24 and a lower outwardly extending flange 71 which terminates in a downwardly extending wall 72. Downwardly extending wall 72 defines a socket 76 for reasons which will become apparent hereinbelow.

A coil spring member 78 is designed to have one end seat within socket 76 while the other end of spring member 78 seats against center wall 16 of seed tray 12. Thus, spring 78 exerts an upward force against plunger 66.

A cover member 90 is provided for purposes of covering seed tray 12 and seed container 28. Cover 90 includes an upper portion 92 which is secured to shroud 40. As is conventional, cover 90 is also provided with a sloping top wall 96 which merges with a vertical wall 98 designed to fit around the outer circumference of upper portion 42 of shroud 40. In turn, vertical wall 98 merges with a drip edge structure which is generally designated by reference numeral 100 and which drip edge structures are well known in the art.

Provided at the top of bird feeder 10 is a negative grip tube generally designated by reference numeral 102. Negative grip tube 102 includes a cylindrical body 104 having a bottom edge sitting on a horizontal seat 94 of cover 90. At its upper end, negative grip tube 102 includes an inwardly tapered wall 108.

A boot 80 is provided interiorly of shroud 40 and has a lower portion 82 designed to seat about an upper portion of center tube 36 while an upper portion 84 seats about an upper end of plunger 66 and extends inwardly of a portion fitting within cover 90 to thereby provide a sealing effect. A main body portion 86 of boot 80 is formed of an accordion like structure for reasons which will become apparent hereinbelow.

A hanging member 110 is provided to hang the bird feeder 10 from any suitable structure. At its upper end, hanging member 110 is provided with an eye 112. There is provided a main shaft 114 and a hook 116. As may be best seen in FIGS. 9 to 11, hook 116 is inserted through aperture 26 of center post 24 and then moved upwardly into position. A sealing ring 118 is provided on main shaft 114.

Figure 7:
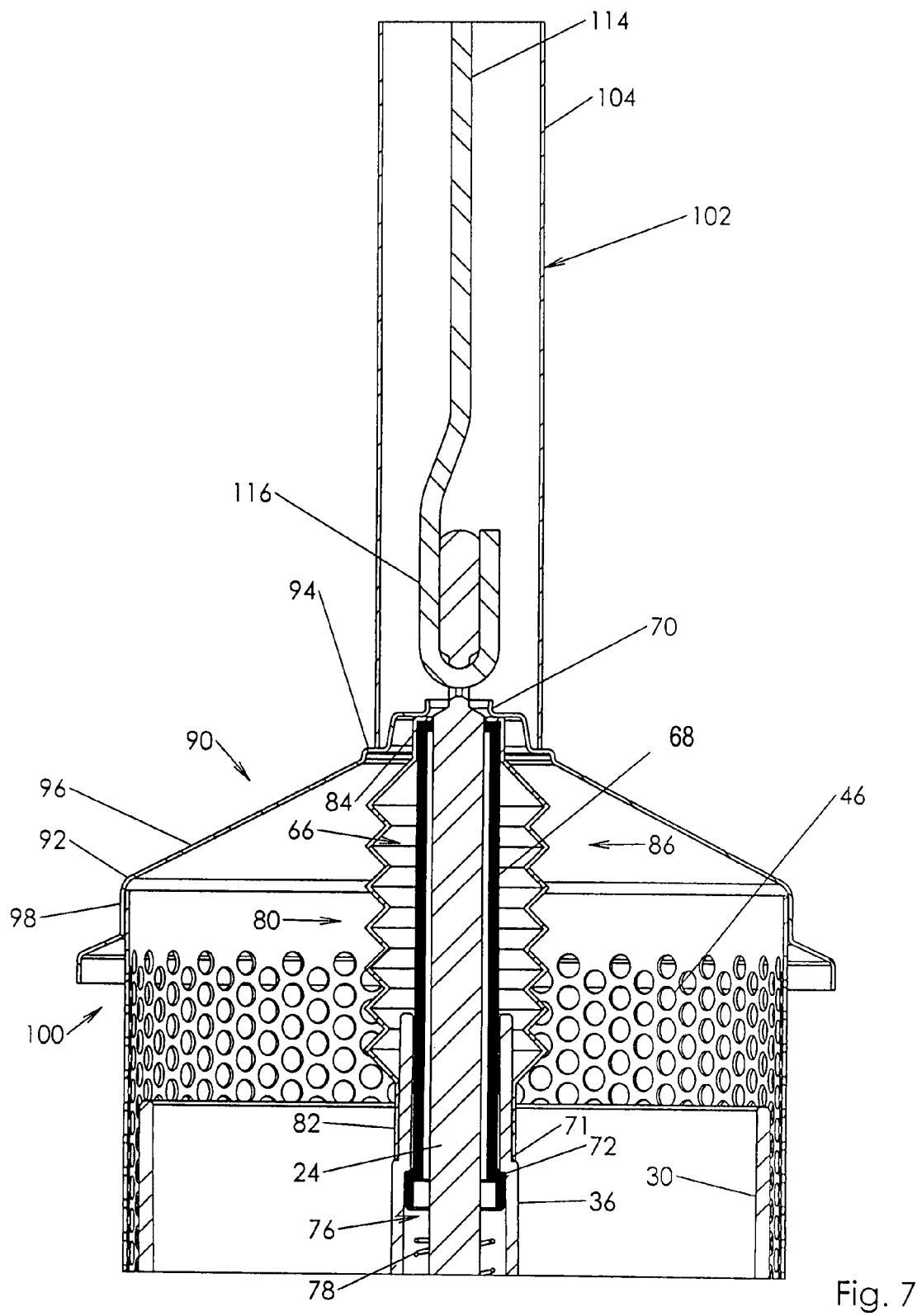
FIG. 7 is a sectional view of the top portion of the feeder in an open position.
Figure 8:
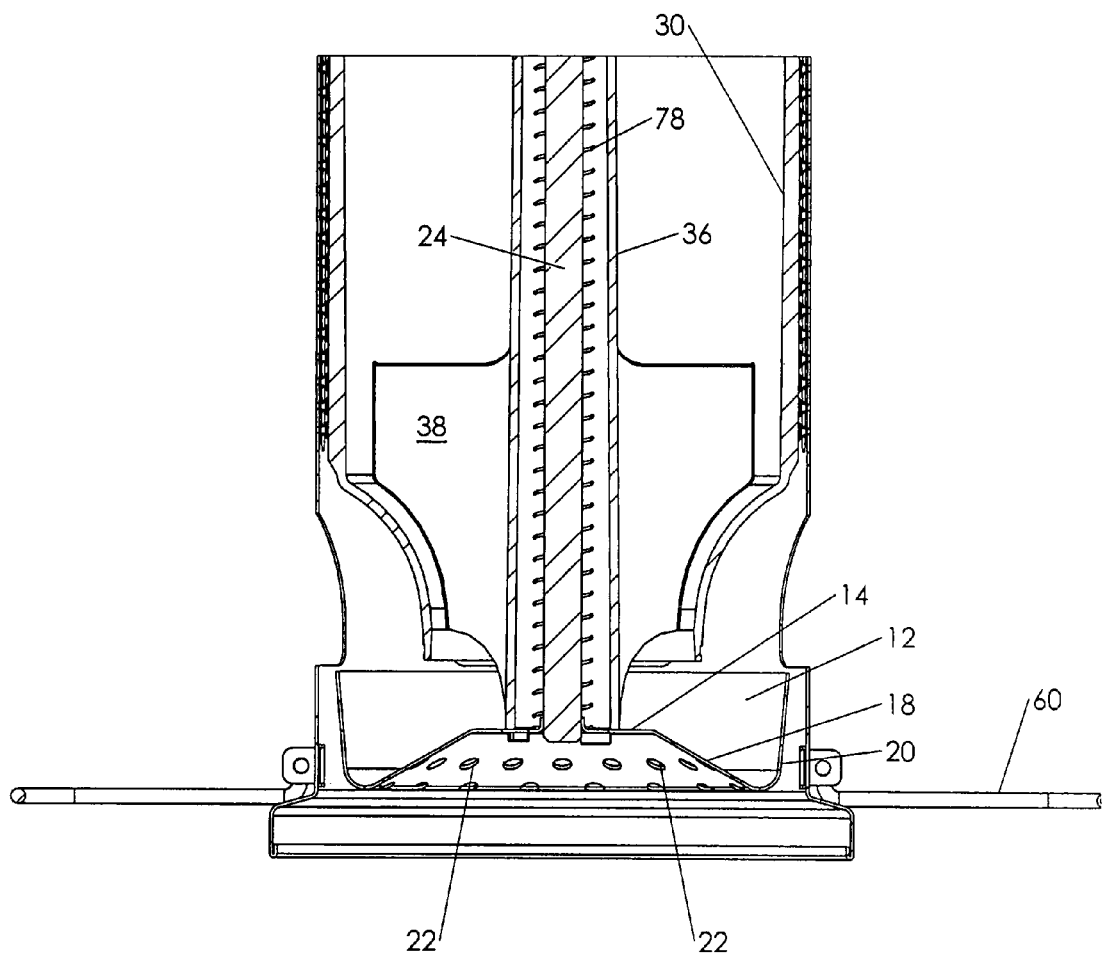
FIG. 8 is a sectional view of the bottom portion of the feeder in an open position.

In use, the bird feeder 10 is utilized in the open position shown in FIGS. 1, 3, 7 and 8. In this arrangement, spring 78 biases plunger 66 upwardly to a stop position. In this position, boot 80 is in extended position as best seen in FIG. 7. Shroud 40 is thus maintained in an open position wherein access to seed tray 12 is permitted. The system of the present invention includes a pair of stops to limit the movement of the shroud. Thus, the downward movement of shroud 40 is limited by a stop wherein sidewall 30 of seed container 28 abuts cover 90. The upward movement is limited by flange 71 abutting against the inwardly extending section of center tube 36 as may be best seen in FIG. 7.

Figure 9:
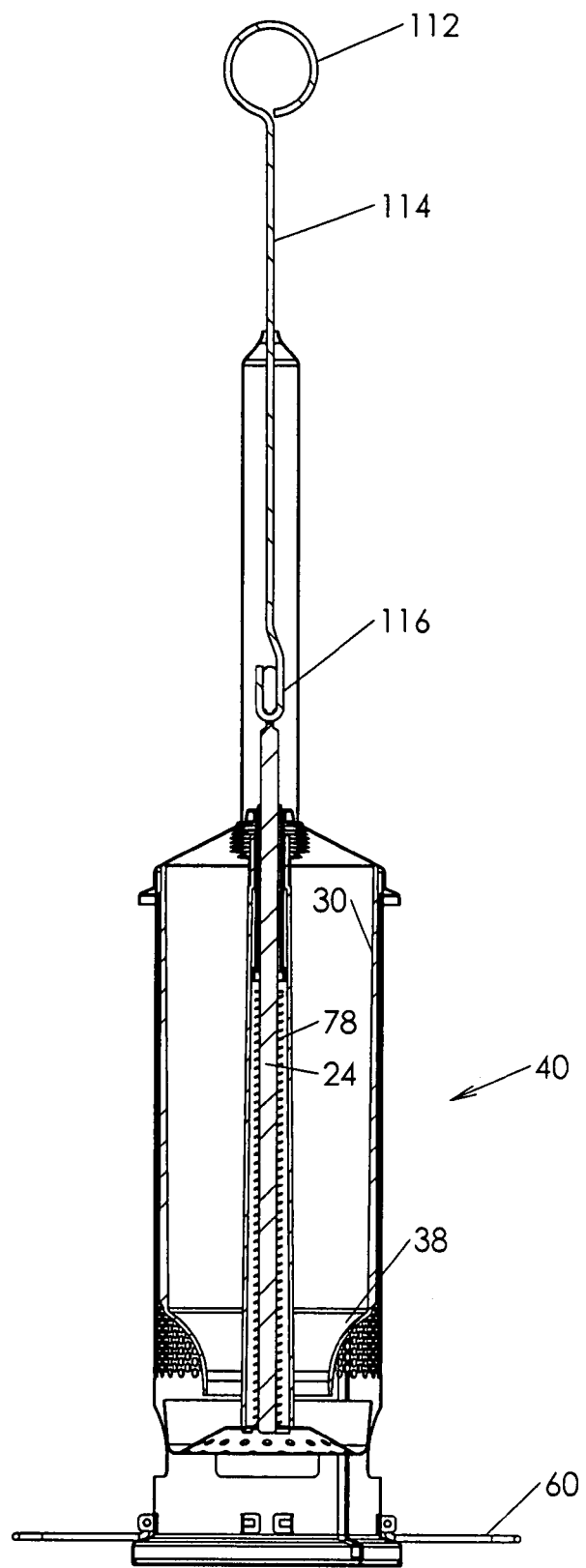
FIG. 9 is a vertical sectional view of the feeder in a closed position when the shroud has descended to cover the feed openings.
Figure 10:
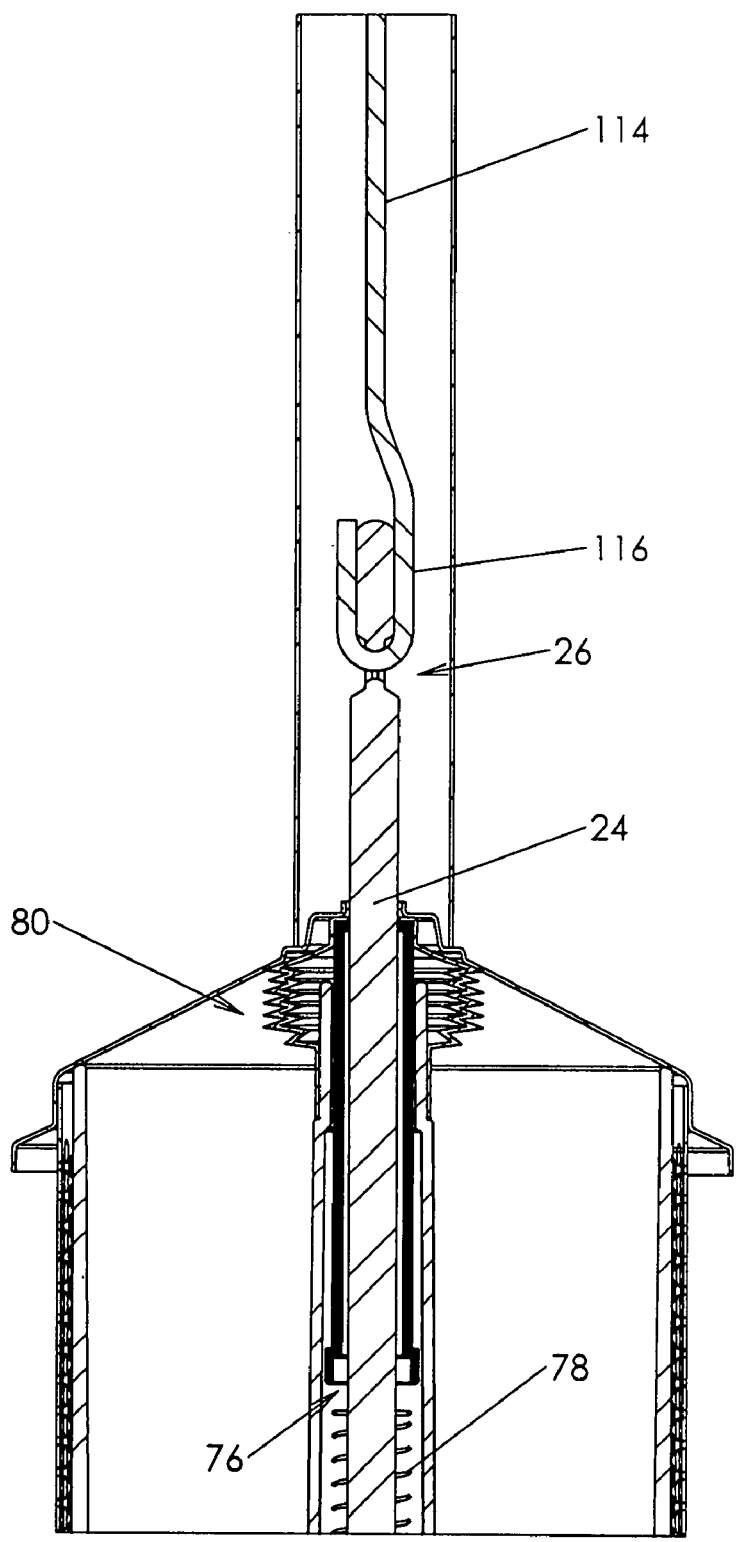
FIG. 10 is a sectional view of the top portion of the feeder from FIG. 9 in a closed position.
Figure 11:
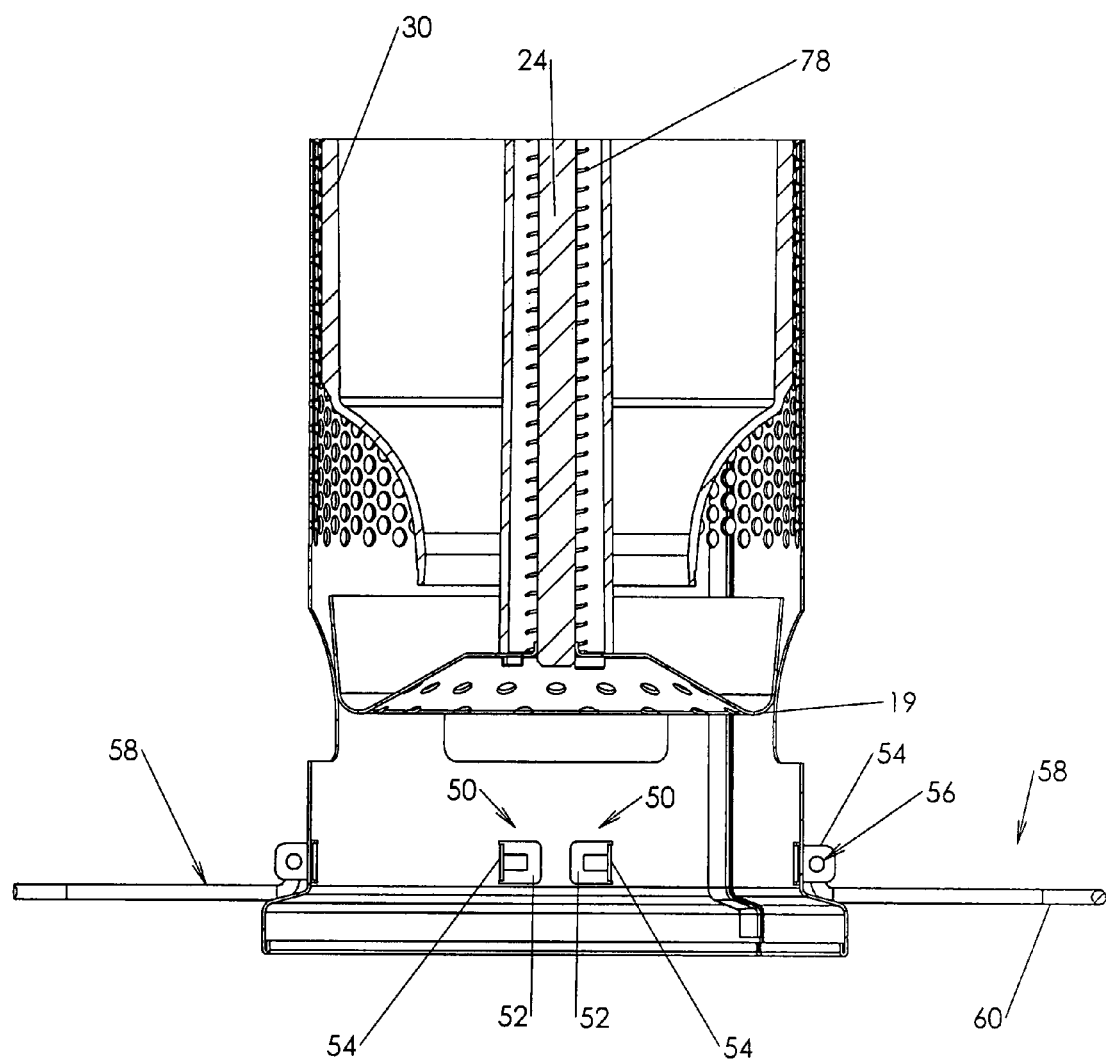
FIG. 11 is a sectional view of the bottom portion thereof in a closed position.
Figure 12:
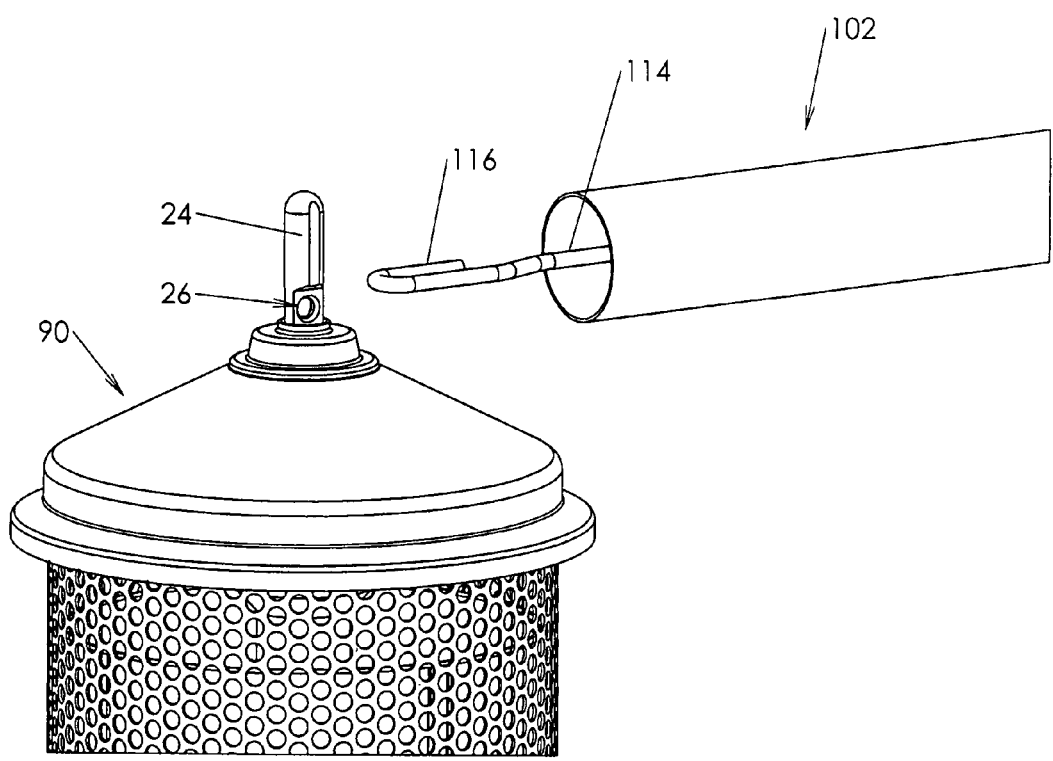
FIGS. 12 to 14 are perspective views of the upper portions of the bird feeder showing attachment of the hanging member to the center rod.
Figure 13:
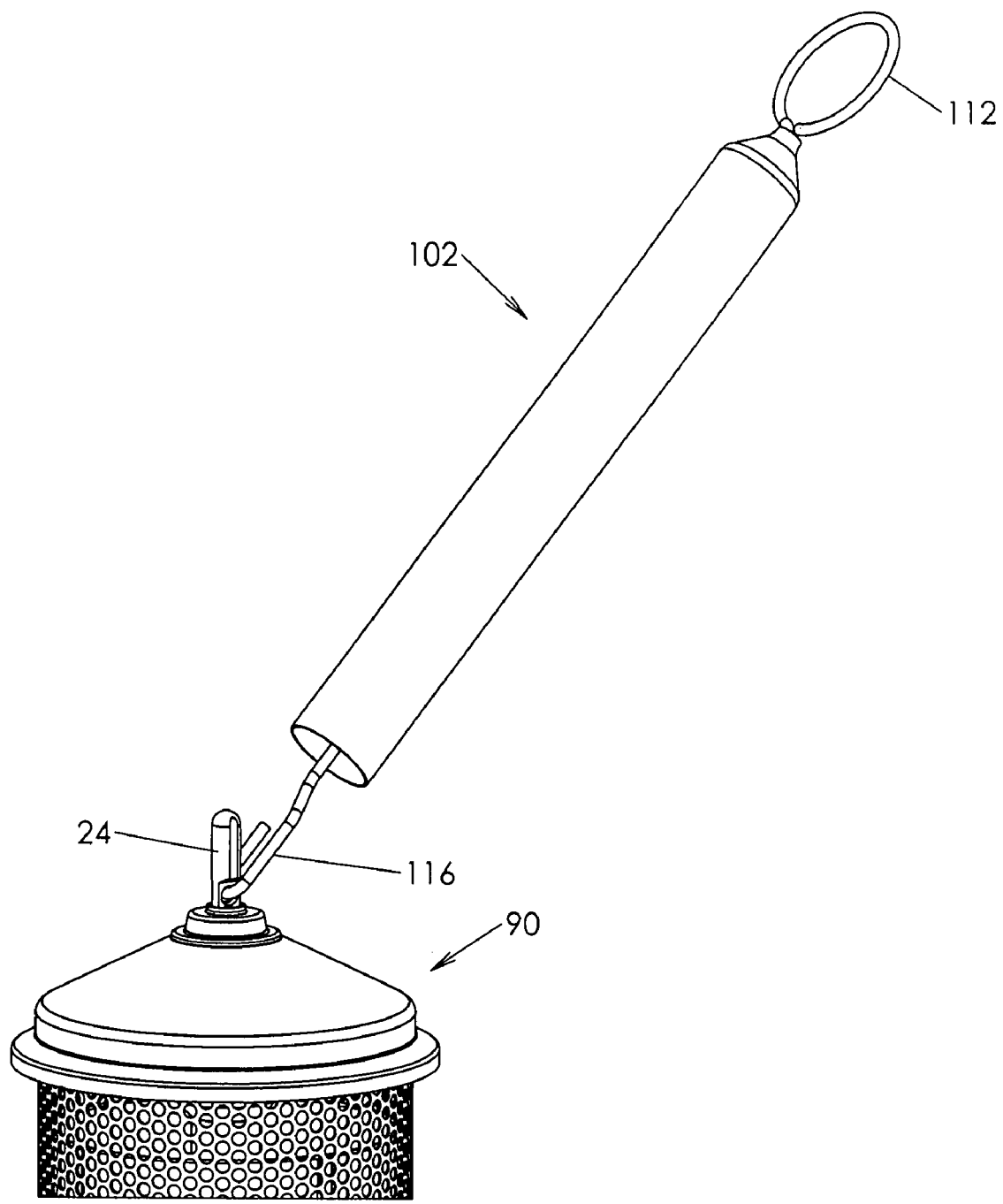
Figure 14:
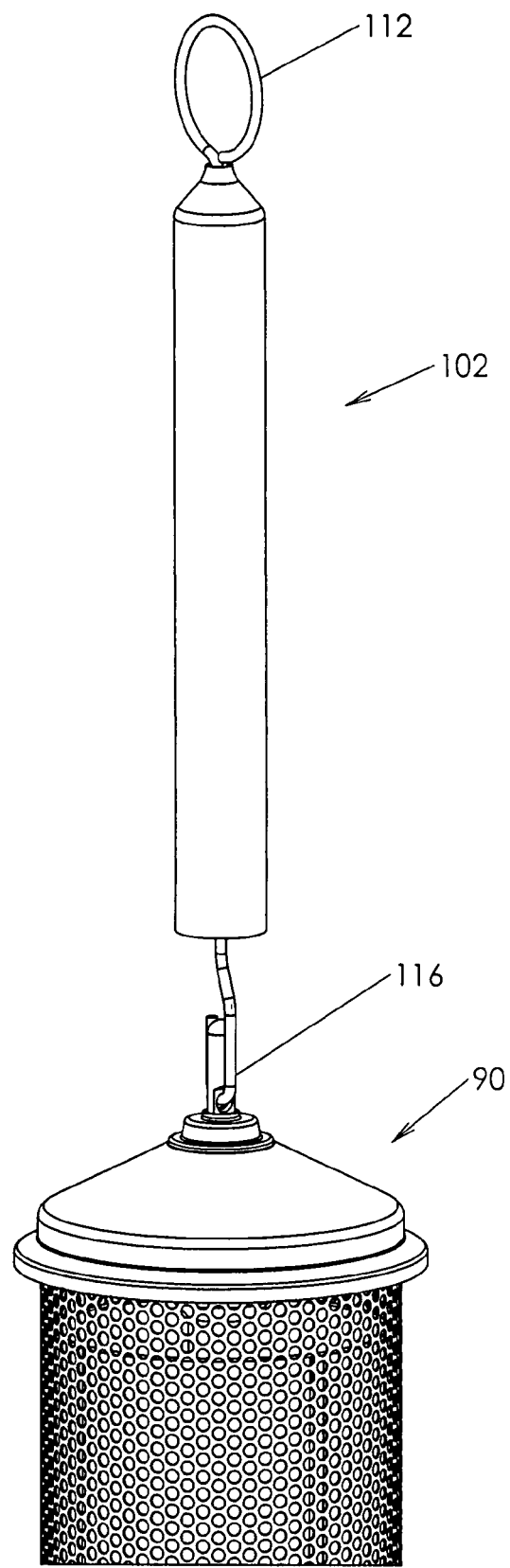

Upon any pressure being exerted on shroud 40, perches 58, cover 90, or negative grip tube 102, spring 78 is pushed into a compressed or closed position as seen in FIGS. 9, 10 and 11. It will be noted that boot 80 also compacts to the accordion like structure. Access to seed tray 12 is then denied.

In the open position of FIGS. 1, 3, 7 and 8, when seeds have been placed within seed tube 28, they are distributed onto seed tray 12. From seed tray 12, access may be had through feed openings 48 such that the birds may feed from the seed tray. However, when a weight such as from a squirrel is placed on any of the exterior components such as shroud 40, perches 58, cover 90 or negative grip tube 102, the shroud 40 will descend to a closed position to cover access to seed tray 12 as may be seen in FIGS. 9 to 11.

Thus, as may be seen from the above, there is provided an effective squirrel proof feeder which is composed of a minimal number of parts and does not require guiding structures and the like. Accordingly, it becomes relatively inexpensive to manufacture.

It will be understood that the above described embodiment is for purposes of illustration only and that changes and modifications may be made thereto without departing from the spirit and scope of the invention.

I claim:

1. A squirrel resistant bird feeder comprising:
a seed container;
a seed tray mounted below said seed container;
a shroud enclosing said seed container and said seed tray in an open and closed position;
at least one feed opening in a lower portion of said shroud;
a cover member extending over said shroud and being non-removably secured thereto;
a central tube extending between said seed tray to an upper portion of said seed container;
a center post within said central tube, said center post having a first end secured to said seed tray, said center post having a second end extending through said cover member; and
a spring member mounted about said center post within said central tube, a first end of said spring member biasing said seed tray, a second end of said spring member being arranged such that said shroud is biased to said open position when said at least one feed opening in said shroud permits access to said seed tray, said shroud being moveable to said closed position when a weight on said shroud compresses said spring member, said closed position denying access to said seed tray.

2. The bird feeder of claim 1 further including at least one perch attached to said shroud, said at least one perch being situated below said feed opening.

3. The bird feeder of claim 1 further including a hanger secured to said second end of said center post, said hanger preventing removal of said cover and shroud.

4. The bird feeder of claim 1 wherein said cover member and said shroud are formed as a single piece.

5. The bird feeder of claim 1 including a plurality of perches attached to said shroud below said feed opening, said perches being pivotably mounted thereto whereby said perches pivot upwardly.

6. The bird feeder of claim 4 further including a negative grip tube extending about said hanger exteriorly of said cover member, said negative grip tube being freely moveable along said hanger.

7. The bird feeder of claim 1 wherein said shroud has an open bottom.

8. The bird feeder of claim 1 wherein said seed container is designed to distribute seeds therefrom onto said seed tray.

9. The bird feeder of claim 1 wherein said seed container, said central tube and said central post comprise a non moveable structure, said shroud and cover member being moveable with respect thereto.

10. The bird feeder of claim 1 further including first and second stop members, said first and second stop members limiting movement of said shroud movement between said open and closed positions.

11. A squirrel resistant bird feeder comprising:
a seed container;
a seed tray mounted below said seed container;
a shroud extending about said seed container and said seed tray;
at least one feed opening in a lower portion of said shroud;
a cover member extending over said shroud and being non-removably secured thereto;
a central tube extending between said seed tray to an upper portion of said seed container;
a center post within said central tube, said center post having a first end secured to said seed tray, said center post having a second end extending through said cover member; and
a spring member mounted about said center post within said central tube, a first end of said spring member biasing said seed tray, a second end of said spring member being arranged such that said shroud is biased to an open position when said at least one feed opening in said shroud permits access to said seed tray, said shroud being moveable to a closed position when a weight on said shroud compresses said spring member, said closed position denying access to said seed tray; and
a plunger, said plunger being mounted within said central tube, said plunger having a lower end forming a socket to receive said second end of said spring, a second end of said plunger abutting said cover.

12. The bird feeder of claim 11 further including a compressible sealing member extending about said center tube and said plunger.

13. A squirrel resistant bird feeder comprising:
a seed container;
a seed tray mounted below said seed container;
a shroud extending about said seed container and said seed tray;
at least one feed opening in a lower portion of said shroud;
a cover member extending over said shroud and being non-removably secured thereto;
a central tube extending between said seed tray to an upper portion of said seed container;
a center post within said central tube, said center post having a first end secured to said seed tray, said center post having a second end extending through said cover member;
a spring member mounted about said center post within said central tube, a first end of said spring member biasing said seed tray, a second end of said spring member being arranged such that said shroud is biased to an open position when said at least one feed opening in said shroud permits access to said seed tray, said shroud being moveable to a closed position when a weight on said shroud compresses said spring member, said closed position denying access to said seed tray;
a hanger secured to said second end of said center post, said hanger preventing removal of said cover and shroud; and
a compressible sealing member extending about an upper end of said central tube.

14. The bird feeder of claim 13 wherein said compressible sealing member has an accordion-like structure.

* * * * *